(12) United States Patent  
Leslie et al.

(10) Patent No.: US 7,131,756 B2  
(45) Date of Patent: Nov. 7, 2006

(54) RECESSED LIGHT SOURCE FOR VEHICLE SEAT BELTS

(75) Inventors: Stuart Leslie, Larchmont, NY (US); Roland Zeder, New York, NY (US)

(73) Assignee: Honeywell International, Inc., Morristown, NJ (US)

( * ) Notice: Subject to any disclaimer, the term of this patent is extended or adjusted under 35 U.S.C. 154(b) by 164 days.

(21) Appl. No.: 10/821,060

(22) Filed: Apr. 8, 2004

(65) Prior Publication Data

US 2005/0122731 A1  Jun. 9, 2005

Related U.S. Application Data

(60) Provisional application No. 60/528,180, filed on Dec. 9, 2003.

(51) Int. Cl.  
*F21V 33/00* (2006.01)  
*F21V 21/00* (2006.01)

(52) U.S. Cl. .................. 362/488; 362/253; 362/545

(58) Field of Classification Search ............. 362/488, 362/800, 487, 184, 191, 396, 234, 253, 545, 362/200, 197, 199  
See application file for complete search history.

(56) References Cited

U.S. PATENT DOCUMENTS

| | | | |
|---|---|---|---|
| 4,215,389 A | 7/1980 | Colangelo | 362/199 |
| 4,365,285 A | 12/1982 | Brundidge | 362/488 |
| 4,400,763 A | 8/1983 | Kribs et al. | 362/103 |
| 4,598,340 A | 7/1986 | Dwosh et al. | 362/98 |
| 4,825,345 A | 4/1989 | Stevens | 362/183 |
| 4,881,155 A | 11/1989 | Gahagan | 362/191 |
| 4,933,818 A | 6/1990 | Eckmann | 362/511 |
| 5,181,773 A | 1/1993 | Colvin | 362/488 |
| 5,738,432 A | 4/1998 | Okko et al. | 362/103 |
| 6,022,119 A | 2/2000 | Booty, Jr. | 362/98 |
| 6,095,657 A | 8/2000 | Kent | 362/108 |
| 6,102,440 A | 8/2000 | Bergkessel | 280/808 |
| 6,575,587 B1 | 6/2003 | Cramer et al. | 362/105 |
| 2004/0052091 A1* | 3/2004 | Lee | 362/570 |
| 2005/0094385 A1* | 5/2005 | Lee | 362/98 |

* cited by examiner

*Primary Examiner*—Sandra O'Shea  
*Assistant Examiner*—Bao Q Truong

(57) ABSTRACT

A portable recessed light source configured for use with a vehicle seat belt, the light source including: a housing having a first housing portion and a second housing portion, the first housing portion having a light emitting source electrically coupled to a power supply, the first housing portion being pivotally secured to the second housing portion; and a retaining clip for securing the housing to the seat belt, the retaining clip being secured to the second housing portion, wherein the first housing portion is positionable into at least two discrete positions with respect to the second housing portion.

20 Claims, 9 Drawing Sheets

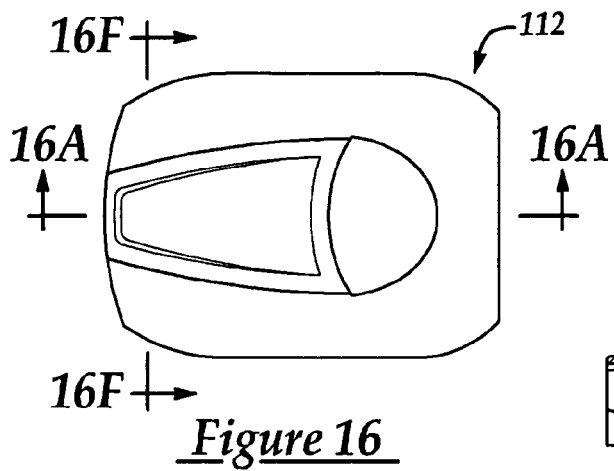
*Figure 16*
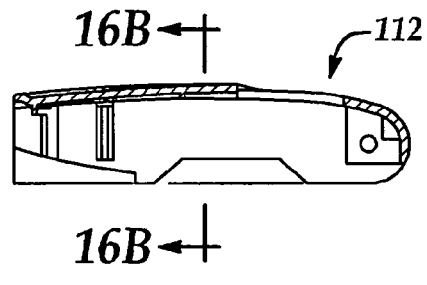
*Figure 16A*
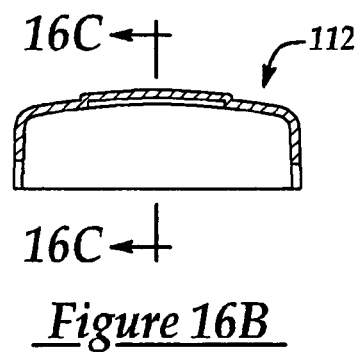
*Figure 16B*
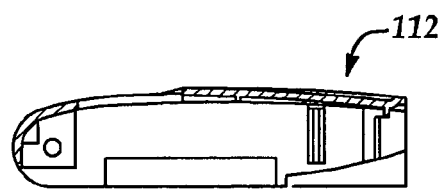
*Figure 16C*
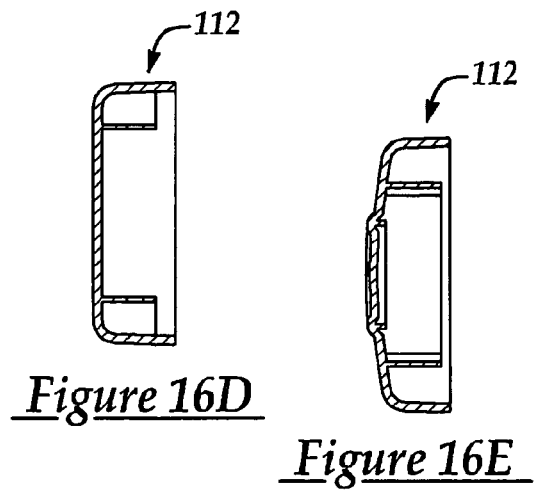
*Figure 16D*
*Figure 16E*
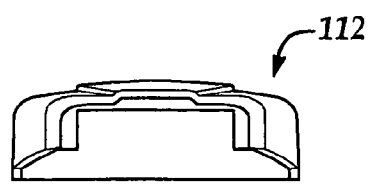
*Figure 16F*
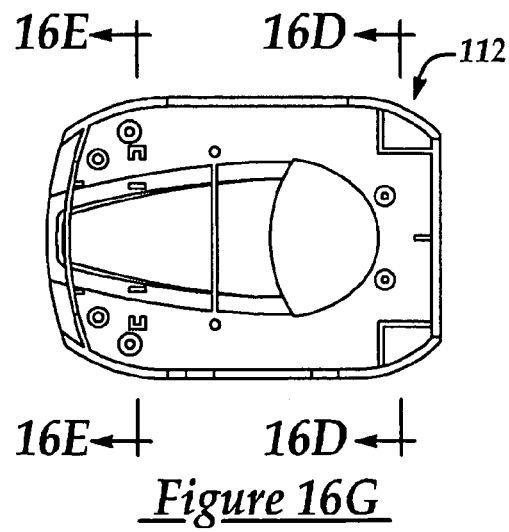
*Figure 16G*

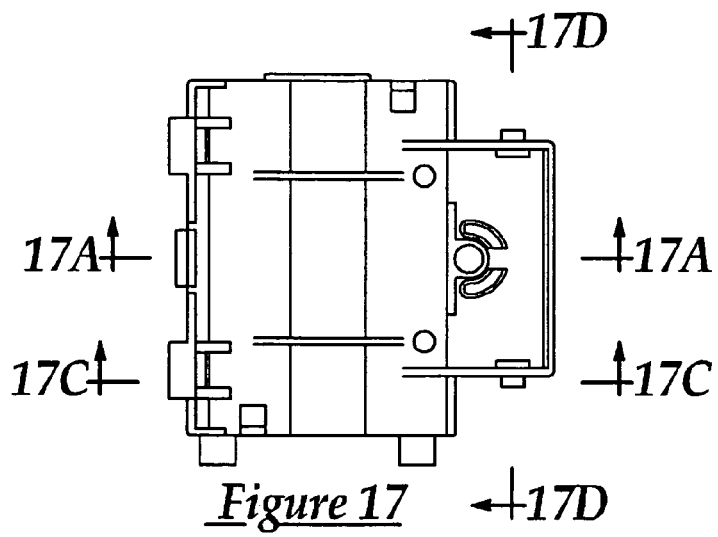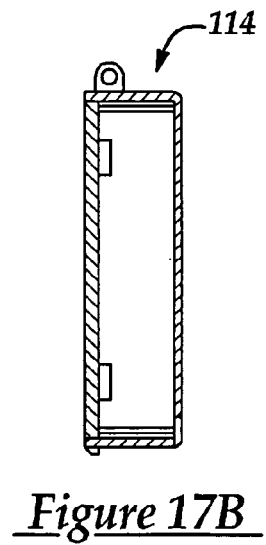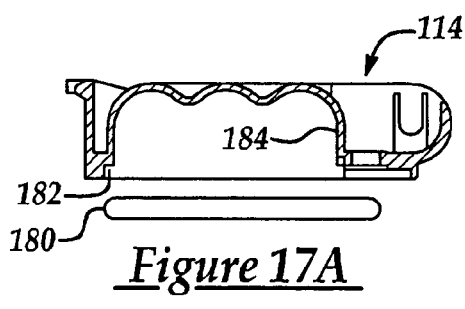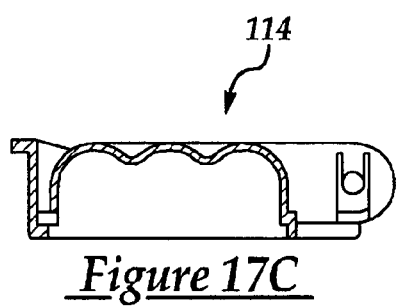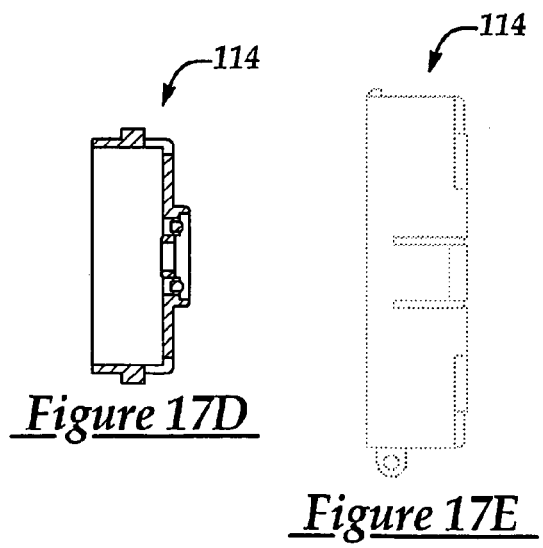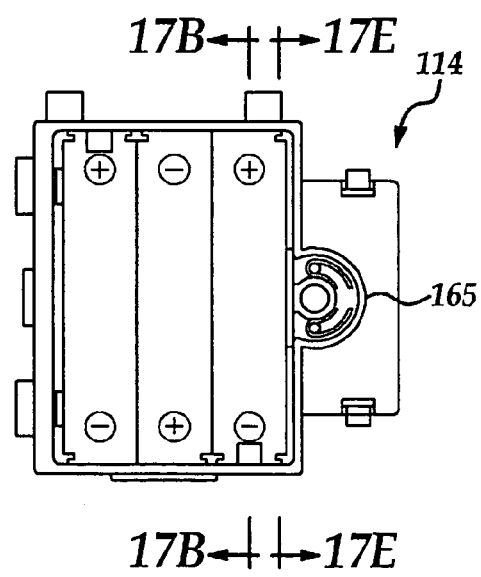

RECESSED LIGHT SOURCE FOR VEHICLE SEAT BELTS

CROSS REFERENCE TO RELATED APPLICATIONS

This application claims the benefit of U.S. Provisional patent application Ser. No. 60/528,180, filed Dec. 9, 2003, the contents of which are incorporated herein by reference thereto.

TECHNICAL FIELD

The present invention relates to an adjustable light source for use with a vehicle seat belt.

BACKGROUND

Most vehicles have interior lights or "dome" lights that are illuminated upon opening of a door of the vehicle or by manipulation of an activation switch disposed proximate to the light or vehicle dashboard, which in this instance may be manipulated by the vehicle operator. However, these types of lights provide general illumination to the entire interior of the vehicle and at night may cause unwanted glare, which is undesirable especially if the vehicle is being operated at night.

Accordingly, it is desirable to provide a portable recessed light for use by a passenger of the vehicle wherein the recessed light only provides discrete illumination in the passenger's "personal space".

SUMMARY OF THE INVENTION

A recessed portable light source configured for use with a vehicle seat belt is provided. Exemplary embodiments provide a portable light source configured for use with a vehicle seat belt, comprising: a housing comprising a first housing portion and a second housing portion, said first housing portion having a light emitting source disposed therein, said light emitting source being electrically coupled to a power supply by an activation switch, said first housing portion being pivotally secured to said second housing portion; and a retaining clip for securing said housing to the seat belt, said retaining clip being secured to said second housing portion, wherein said first housing portion is positionable into at least two discrete positions with respect to said second housing portion.

Another exemplary embodiment provides a portable light source configured for use with a vehicle seat belt, comprising: a housing comprising a first housing portion and a second housing portion, the first housing portion being pivotally secured to the second housing portion, the first housing portion defining a receiving area for receiving the second housing portion therein; a light emitting source, the light emitting source being disposed in a recessed area of the first housing portion and is electrically coupled to a power supply disposed in the second housing portion by an activation switch; and a retaining clip for securing the second housing portion to the seat belt, the retaining clip being pivotally secured to the second housing portion and comprises an engagement tab for engaging a portion of the second housing portion, wherein the first housing portion is positionable into at least two discrete positions with respect to the second housing portion and the retaining clip is configured to have a width not much lager than the width of the seat belt.

Still another exemplary embodiment provides a portable light source configured for use with a vehicle seat belt, comprising: a housing comprising an upper housing portion and a lower housing portion, the upper housing portion being pivotally secured to the lower housing portion; a light carrying portion being secured to the upper housing portion, the light carrying portion being configured to receive a light emitting source and the upper housing further comprises a switching member, the switching member being movably mounted to the upper housing portion, a portion of the switching member being disposed within an opening of the upper housing portion, wherein the switching member is capable of movement from a first position to a second position upon application of an applied force and the switching member manipulating a switching mechanism of the portable light source as the switching member is manipulated from the first position to the second position, wherein the switching mechanism is configured to electrically couple a power supply to the light emitting source.

The above-described and other features are appreciated and understood by those skilled in the art from the following detailed description, drawings, and appended claims.

DESCRIPTION OF THE DRAWINGS

FIGS. 15A–21 are views illustrating another exemplary embodiment of the present invention.

DETAILED DESCRIPTION OF EXEMPLARY EMBODIMENTS

Figure 1:
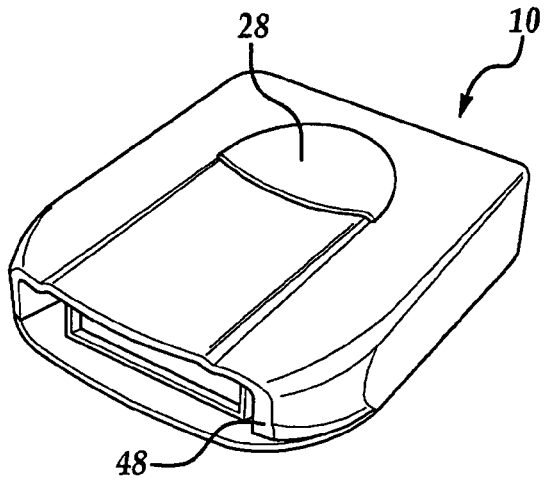
FIG. 1 is a perspective view of a portable light constructed in accordance with an exemplary embodiment of the present invention.

In accordance with exemplary embodiments of the present invention, a portable light configured for use with a vehicle seat belt is disclosed herein. The portable light is configured to have a width similar to that of a vehicle seat belt. Accordingly, the portable light source of exemplary embodiments of the present invention is easily affixed to a vehicle seat belt in an aesthetically pleasing manner. Moreover, the portable light source is configured to have a retaining clip such that movement of the same along the vehicle seat belt is easily achieved. In addition, the portable light source is configured to provide light from a recessed area such that the emitted light is directed into a discrete area and the housing of the light source is positionable into different angular configurations so as to vary the direction of the provided light. These and other features of exemplary embodiments of the present invention allow the portable light source to provide a passenger of a vehicle with a means for illuminating a book, magazine or other reading material, game or their personal area without disturbing other occupants of the vehicle as well as not requiring the individual to hold the light source.

Referring now to FIGS. 1–7 a portable light 10 constructed in accordance with an exemplary embodiment of the present invention is illustrated. Portable light 10 comprises an upper housing portion 12 and a lower housing portion 14. Upper housing portion 12 is pivotally mounted to lower housing portion 14 such that upper housing portion 12 is positionable in at least two operative positions with respect to lower housing portion 14 such that the light source of portable light 10 is redirectable when the same is secured to a seat belt of a vehicle. It is, of course, understood that upper housing portion 12 may be positioned in more than two positions with respect to lower housing portion 14. The pivotal securement of upper housing portion to lower housing portion 14 is achieved in a non-limiting example by disposing a pair of pins in either upper housing portion 12 or lower housing portion 14 while the pair of pins are received in a corresponding pair of openings in the other housing portion such that the housing portions are capable of pivotal movement with respect to each other.

In addition, upper housing portion 12 is also pivotally secured to lower housing portion 14 such that access is provided to a battery storage compartment 16. Battery storage compartment 16 is defined by a plurality of side walls 18 of lower housing portion 14. Accordingly, upper housing portion 12 is positionable such that an individual may insert or replace a plurality of batteries 20 which make electrical contact with a plurality of contacts 22 in order to supply the necessary power to a light source 24 of portable light 10.

In accordance with an exemplary embodiment light source 24 comprises a plurality of LED lights which will provide a sufficient amount of luminance when coupled to a plurality of batteries via a switching mechanism 26. Moreover, the use of LED lights will have a lower power consumption and longer product life than other light bulbs. Of course, the present invention is not limited solely to the use of LED lights and it is contemplated that light bulbs or other equivalent luminary devices may be used with the present invention. Switching mechanism 26 is disposed between plurality of batteries 20 and light source 24 such that manipulation of switching mechanism 26 from an open circuit position to a closed-circuit position will cause illumination of the plurality of LED lights.

Figure 3:
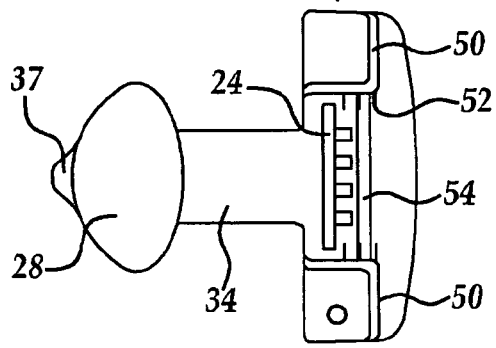
FIG. 3 is a top plan view of a component part of a portable light constructed in accordance with an exemplary embodiment of the present invention.
Figure 4:
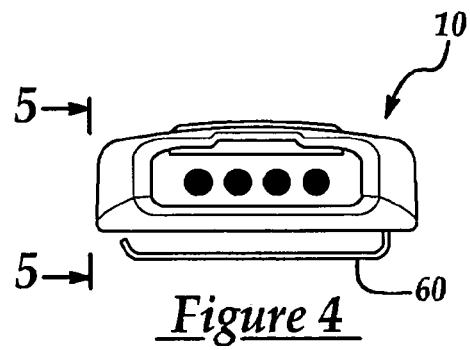
FIG. 4 is a view of a forward end of a portable light constructed in accordance with an exemplary embodiment of the present invention.
Figure 5:
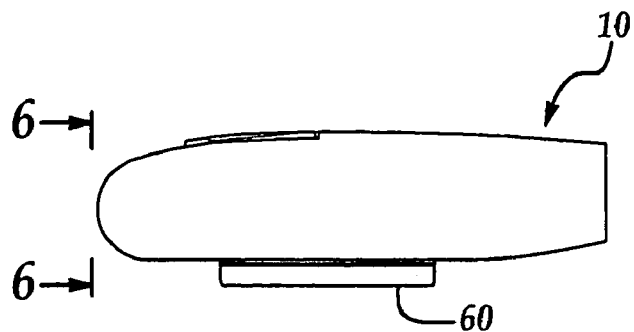
FIG. 5 is a view along lines 5—5 of FIG. 4.
Figure 6:
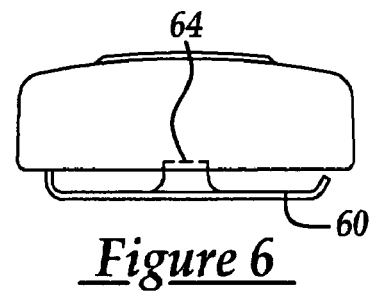
FIG. 6 is a view along lines 6—6 of FIG. 5.
Figure 7:
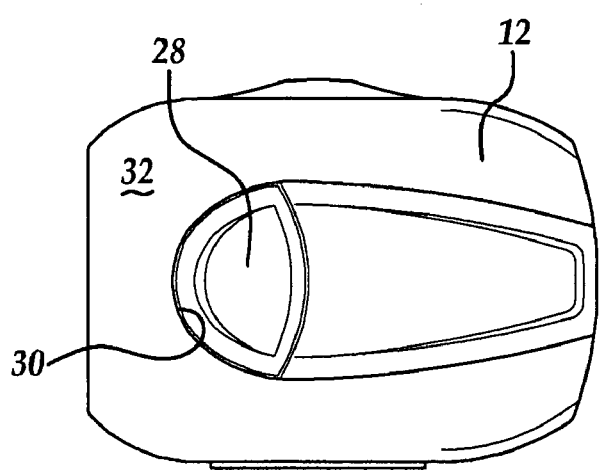
FIG. 7 is a top plan view of a portable light constructed in accordance with an exemplary embodiment of the present invention.

In accordance with an exemplary embodiment of the present invention a switching member 28 is disposed in an opening 30 of an upper surface 32 of upper housing portion 12. In accordance with an exemplary embodiment, switching member 28 is integrally formed with a portion or light carrier portion 33 of upper housing portion 12. Portion 33 is separately formed and secured to upper housing portion 12. This will allow the LED light source to be secured to portion 33 prior to its securement to upper housing portion 12. A top view of portion 33 is illustrated in FIG. 3. Upper housing portion 12 and portion 33 are each manufactured out of an easily molded material such as plastic wherein switching member 28 further comprises an extended tab portion 34 which is secured to or integrally formed with a portion of portion 33 at one end and switching member 28 at the other. The length of extended tab portion 34 and the material of the tab portion is, in an exemplary embodiment, formed out of a material that will provide a biasing force to maintain switching member 28 in a first position and allow the same to be manipulated to a second position (e.g., a switch activation position) upon application of an activation force and upon removal of the activation force the switching member will return back to the first position.

In addition, as the switching member is manipulated from the first position to a second position a lower portion of the switching member will make contact with the switching mechanism in order to close or open the circuit of the switching mechanism (e.g., turn on or turn off the portable light). In addition, and as an alternative exemplary embodiment, switching mechanism 26 and light source 24 are configured to have a high and low light settings which are achieved by simply depressing switching member 28 in order to move switching mechanism 26 from a non-illuminating position to a low-level illuminating position (e.g., two of the four LEDs being illuminated) and a high level illuminating position (e.g., all four of the LEDs being illuminated). In addition, and as yet another alternative exemplary embodiment a pair of integrally formed tab members 36 are positioned to provide a limit to the deflection of switching member 28 when an application force is applied thereto. Tab members 36 are configured and positioned to engage a tab portion 37 of portion 33. Accordingly, and in order to secure portion 33 to upper housing portion, tab portion 37 is positioned between tab members 36 and switching member 28 is disposed within opening 30 and portion 33 is secured to upper housing portion 12 by any suitable securement means such as screws or a equivalent thereof. Once secured to upper housing portion 12 portion 33 defines a periphery of the upper housing portion which receives lower housing portion 14 therein.

Figure 2:
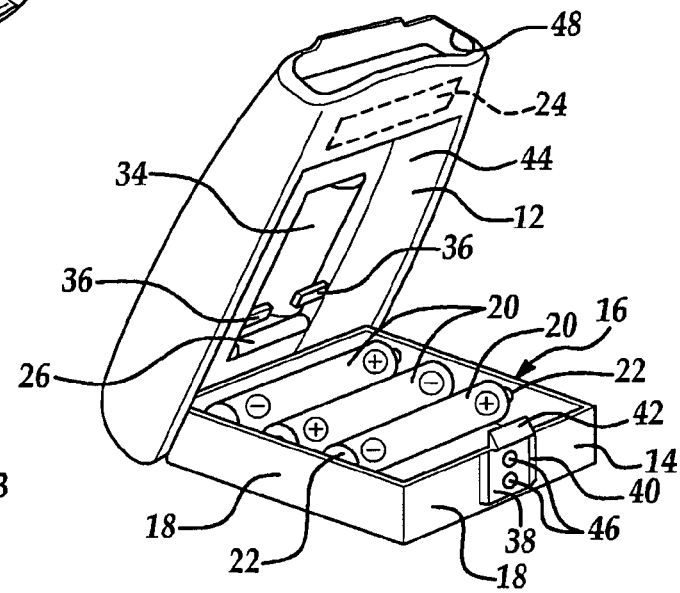
FIG. 2 is a perspective view illustrating features of a portable light constructed in accordance with an exemplary embodiment of the present invention.

Referring now to FIG. 2, sidewall 18 disposed at a forward end of portable light 10 comprises an integrally formed engagement member 38 which is positioned in an opening 40 of sidewall 18. Engagement member 38 comprises a locking portion 42 configured to have an angled surface and complementary shoulder portion for engaging a lip of upper housing portion 12 as upper housing portion 12 is pivoted from the positioned illustrated in FIG. 2 to the positioned illustrated in FIGS. 1, 3–5 and 7. In accordance with an exemplary embodiment, locking portion 42 may be positioned to engage and defined by portion 33 after it is secured to upper housing portion 12.

As illustrated in FIG. 2 upper housing portion defines a receiving area 44 which is configured, dimensioned and positioned to receive lower housing portion 14 therein. As upper housing portion 12 moves towards a position wherein a lip portion comprising a periphery of receiving area 44 engages locking portion 42 wherein the angled surface of locking portion 42 makes contact with the lip portion of receiving area 44 and engagement member 38 depends inwardly towards battery storage compartment 16 until the lip portion of receiving area 44 passes the shoulder portion of the locking portion. At this point and due to the resilient material of engagement member 38, engagement member 38 will spring back to an unbiased position thereby causing locking portion 42 to be disposed in a position to limit the pivotal movement of upper housing portion 12 with respect to lower housing portion 14.

Figure 8:
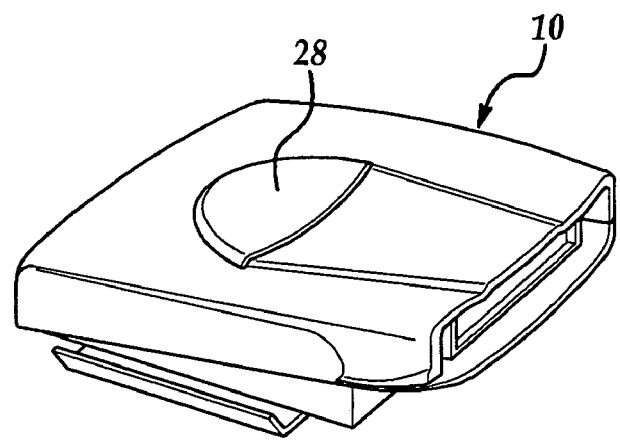
FIG. 8 is a perspective view illustrating one operating position of a portable light constructed in accordance with an exemplary embodiment of the present invention.
Figure 9:
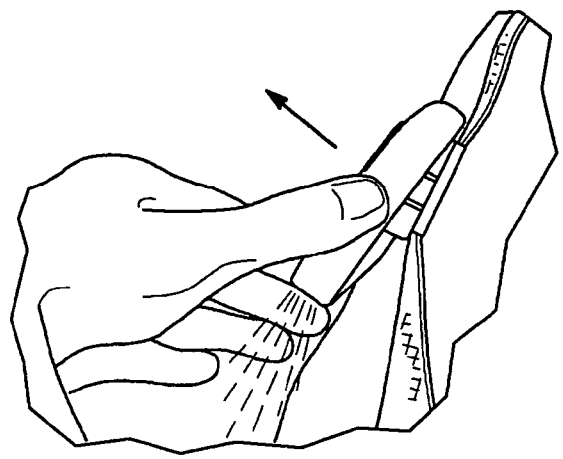
FIGS. 9–14 are views illustrating uses of exemplary embodiment of the present invention.
Figure 10:

Disposed below locking portion 42 is a pair of locking features or protrusions 46 which depend outwardly from a surface of engagement member 38. Protrusions 46 are positioned to engage the periphery of receiving area 44 in order to provide at least two angular configurations of upper housing portion 12 with respect to lower housing portion 14 such that the light source of portable light 10 is redirectable once the same is secured to a vehicle seat belt. Similar to the engagement of locking portion 42 with respect to upper housing portion 12 contact with protrusions 46 cause engagement member 38 to depend inwardly as upper housing portion 12 makes contact with one of the protrusions. In other words, protrusions 46 provide a shelf or shoulder upon which a portion of upper housing portion 12 rests to define an angular configuration with respect to lower housing portion 14 (FIG. 8). Accordingly, engagement member 38 provides a means for providing two angular positions of upper housing portion 12 with respect to lower housing portion 14 (e.g., redirecting the light source of portable light 10). Moreover, and should an operator wish to replace the batteries of portable light 10 users simply depresses engagement member 38 with their finger so as to allow upper housing portion 12 to pass by locking portion 42 and ultimately the positioned in the configuration at least illustrated in FIG. 2.

Upper housing portion 12 and portion 33 are configured to define a recessed area 48 located at an end portion of upper housing portion 12. Recessed area 48 receives a wall portion 50 of portion 33 as it is secured to upper housing portion 12. Wall portion 50 is configured to have an opening 52 for receipt of a translucent material 54 therein. Translucent material 54 allows light generated by light source 24 to pass therethrough. In an alternative exemplary embodiment translucent material 54 is a clear plastic barrier that does not limit the transference of light therethrough yet provides a protective shield for light source 24.

Recessed area 48, which is defined in part by portion 33 and upper housing portion 12 provides a brim or surrounding wall about light source 24. This surrounding wall will direct the light generated by light source 24 in the direction of the forward end of portable light source 10. This is particularly useful in applications of portable light source 10 since an intended use of the same is to position the portable light source on a seat belt of a vehicle thereby allowing the user to use portable light 10 in the vehicle to read a book or other item without an overhead dome light of the interior compartment of the vehicle to be activated. As described herein and illustrated in the attached figures, portable light 10 focuses a powerful LED light source directly where a passenger of a vehicle desires it to be focused with lighting beyond the passenger's personnel space within the vehicle. The recessed lighting configuration of an exemplary embodiment of the present invention keeps the light contained so that the passenger's personnel space is lit perfectly for reading, map reading, gaming or doing work while the remainder of the vehicle's interior compartment remains un-illuminated. This is particularly useful if other passengers are sleeping.

Portable light 10 further comprises means for providing electrical connection between light source 24, switching mechanism 26 and plurality of batteries 20 in order to activate light source 24 upon manipulation of switching mechanism 26. As discussed above manipulation of switching member 28 causes a portion of switching member 28 to make contact with switching mechanism 26 wherein manipulation of switching mechanism 26 causes the output of light source 24 to vary. In accordance with an exemplary embodiment, switching mechanism 26 is disposed upon a circuit board having circuitry for connecting the power supply to the light emitting source upon manipulation of switching mechanism 26 as well as including circuitry for providing low-level and high-level operation of the light emitting source. Such an electrical circuit for connecting the power supply to the light emitting source via switching mechanism 26 is considered to be known to those skilled in the related arts and further detailed explanation thereof is not necessary.

Referring now to FIGS. 1, 4, 5 and 6 lower housing portion 14 is constructed to have an integrally molded clip portion 60 which is secured to lower housing portion 14 at one end and comprises a free portion at the other. Clip portion 60 is angularly configured with respect to a lower surface of the housing portion 14 and is molded out of the same plastic material as lower housing portion 14 thus, clip portion 60 will have resilient characteristics that allow the same to be deflected away from a lower surface of lower housing portion 14 in order to insert a portion of a seat belt therein. Moreover, the resilient characteristics will also provide a biasing force back towards lower housing portion 14 in order to maintain portable light 10 in a fixed position with respect to a seat belt.

In addition, clip portion 60 is also configured to have a width slightly larger than the width of a vehicle seat belt such that the same can be received within a space defined by upper housing portion 14 and clip portion 60. Clip portion 60 is also configured to have a raised protrusion 62 which is received within an opening 64 of lower housing portion 14. Reduced protrusion and or protrusions 62 are received within opening 64 when clip portion 60 issues in an unbiased position (e.g., corresponding to the seatbelt engaging position). Accordingly, clip portion 60 and protrusion 62 provide a means for engaging a portion of a seatbelt therebetween.

In addition, clip portion 60 may be configured to have additional belt engagement features such as a plurality of other projections disposed on the surface of clip portion 60 which engages the seat belt. Moreover, once the desired location of the portable light source on the seat belt is achieved the clip portion will secure the light source in that position thus, an individual may leave the light source on the seatbelt during vehicle egress and ingress. Additionally, by securing the portable light source to the vehicle seat belt the passenger is provided with a "hands-free" method for providing desired illumination.

Figure 11:
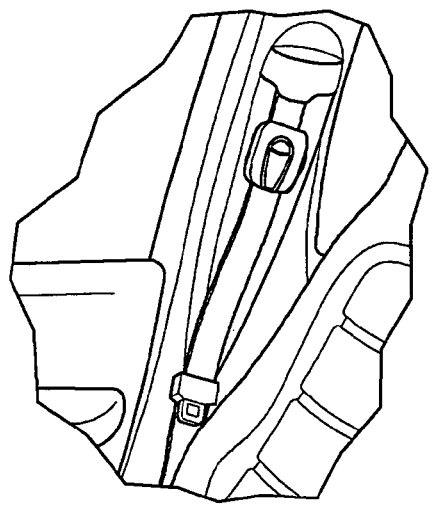
Figure 12:
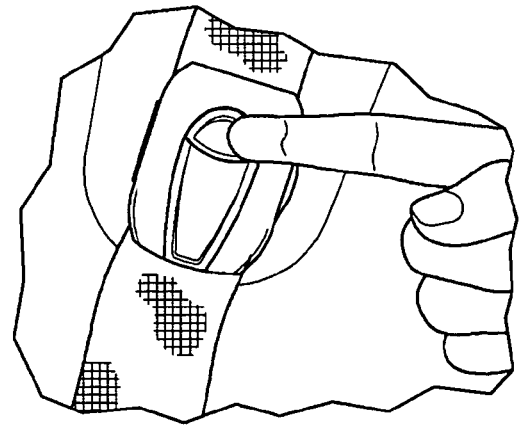
Figure 13:
Figure 14:
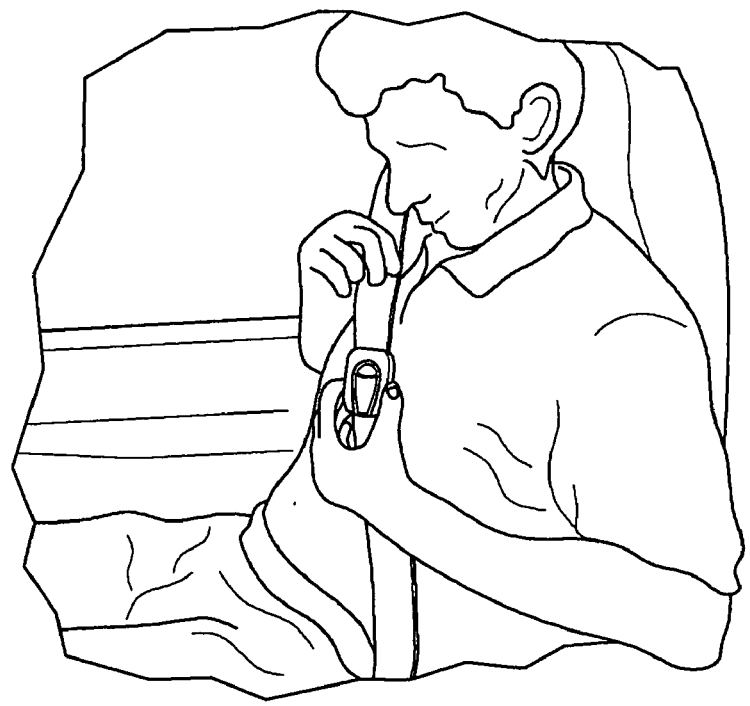

Referring now to FIGS. 9–14 usage and various features of exemplary embodiment of the present invention are illustrated. As discussed herein clip portion 60 allows portable light 10 to be easily secured to a vehicle seat belt. Moreover, and due to the compact configuration of portable light source 10 there is no need to remove the same from the vehicle seat belt. In fact, the overall width of portable light 10 is very close to the width of the seatbelt upon which it is secured thus, portable light 10 becomes less perceivable when it is left on an unused seatbelt (FIG. 11). Moreover, the overall height of portable light 10 is relatively small such that portable light 10 provides a sleek profile and may look like a portion of the seatbelt upon which it is secured (FIGS. 9–14). A non-limiting example of the height of the portable light source is approximately 20 millimeters. Of course, heights greater than or lower than 20 millimeters are considered to be within the scope of exemplary embodiments of the present invention.

Referring now to FIGS. 15A–19E yet another exemplary embodiment of the present invention is illustrated. Here component parts performing similar or analogous functions are numbered in multiples of 100. As illustrated in FIGS. 15A–19E, portable light 110 comprises an upper housing portion 112 and a lower housing or battery compartment 114. In this embodiment, the retaining clip 160 (FIGS. 19A–19E) is pivotally secured to the bottom of lower housing portion 114. The retaining clip further comprises a tab portion 161 which is configured to engage a portion of lower housing portion 114 (FIG. 15D). Opposite tab portion 161 is a hinging member 163 which allows pivotal movement clip 160 with regard to lower housing portion 114 in order to allow the same to be disposed around a vehicle seat belt and have the seatbelt secured therein.

As an alternative embodiment, the pivotal movement of clip 160 allows an individual to access the battery compartment via a battery door 180 disposed on the lower surface of battery compartment 114. In an exemplary embodiment battery door 180 is configured to cover an opening 182 of a battery compartment 184. Accordingly, an individual can replace the batteries without completely removing battery compartment 114 from upper housing portion 112 by simply pivoting retaining clip 160 away from battery compartment 114 in order to allow removal of battery door 180.

Figure 18:
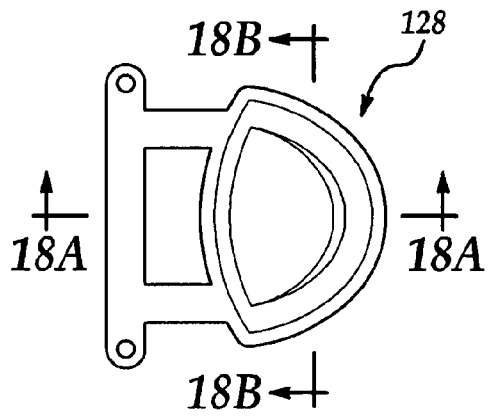
Figure 18A:
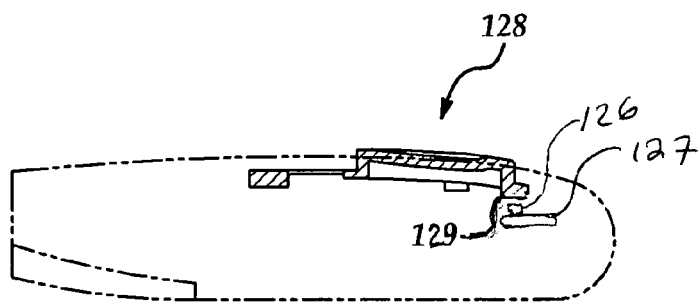
Figure 18B:
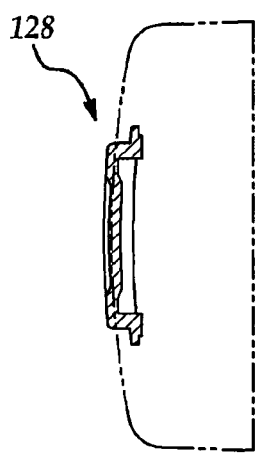
Figure 18C:
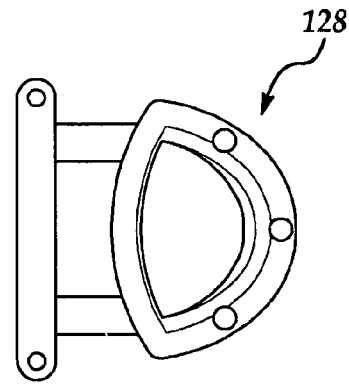
Figure 19:
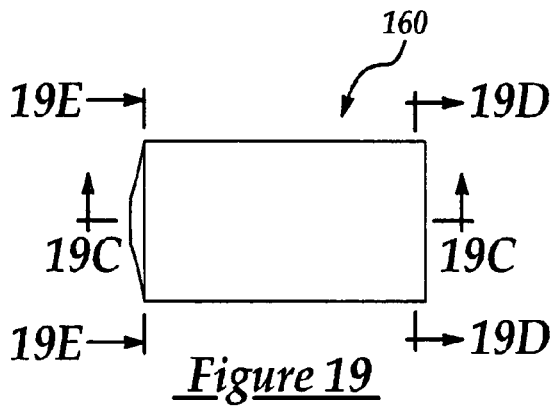
Figure 19A:
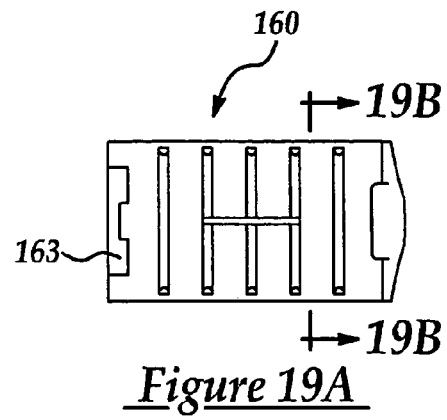
Figure 19B:
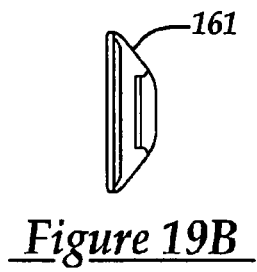
Figure 19C:
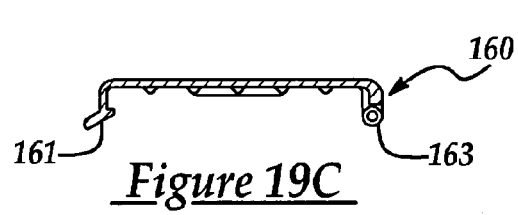
Figure 19D:
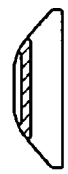
Figure 19E:
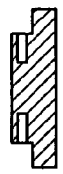
Figure 20:
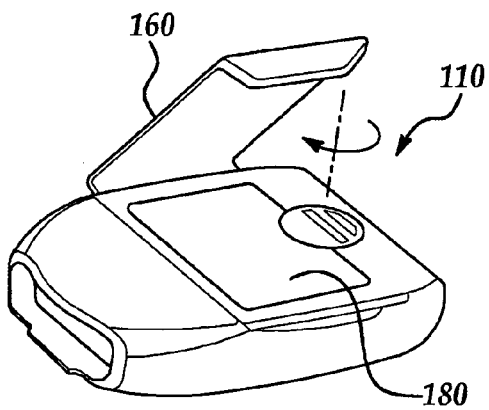
Figure 21:
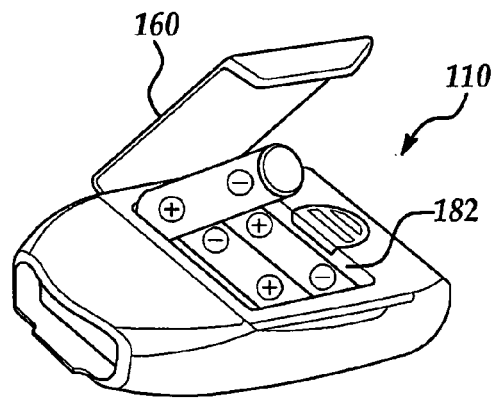

In addition, lower housing portion 114 is configured to have a securement feature 165 configured to releasably secure battery door 180 to lower housing portion 114. Similarly to the embodiment of FIGS. 1–8 the lower housing portion is configured to have an integrally formed engagement member 138 configured to engage the upper housing portion at various positions to provide multiple pivotable configurations of upper housing portion 112 with respect to lower housing portion 114. Furthermore, the configuration of switching member 128 is illustrated in FIGS. 18–18C. Switching member 128 is configured to have a portion 129 which makes contact with a switching mechanism 126 disposed within portable light 110. As with the previous embodiments a switching mechanism 126 and electrical connectors couples light source 124 to a plurality of batteries 120 in order to activate light source 124 upon manipulation of switching mechanism 126. As discussed herein manipulation of switching member 128 causes portion 129 to make contact with switching mechanism 126 wherein manipulation of switching mechanism 126 causes the output of light source 124 to vary. In accordance with an exemplary embodiment, switching mechanism 126 is disposed upon a circuit board 127 having circuitry for connecting the power supply to the light emitting source upon manipulation of switching mechanism 26 as well as circuitry for providing low-level and high-level operation of the light emitting source. Such an electrical circuit for connecting the power supply to the light emitting source via switching mechanism 126 is considered to be known to those skilled in the related arts and further detailed explanation thereof is not necessary.

Figure 15A:
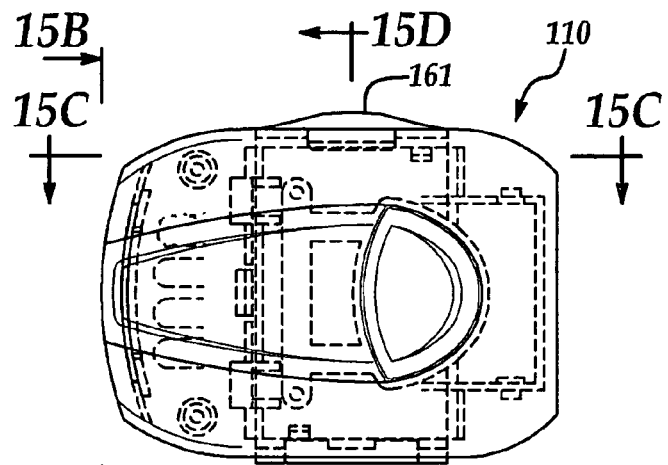
Figure 15B:
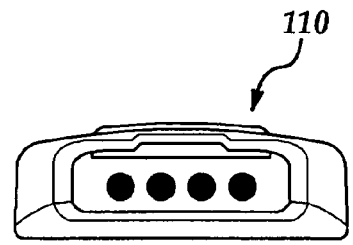
Figure 15C:
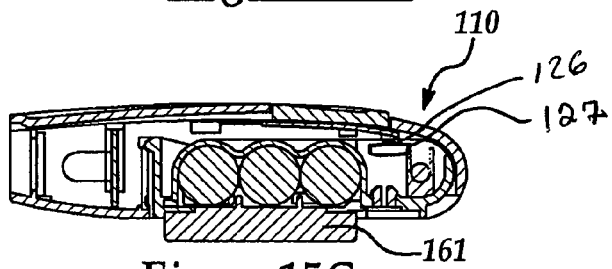
Figure 15D:
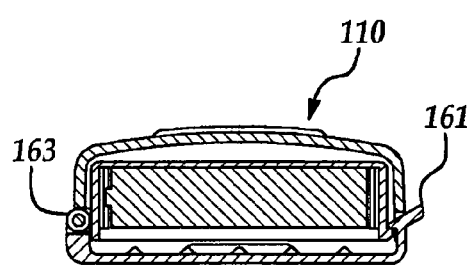
Figure 15E:
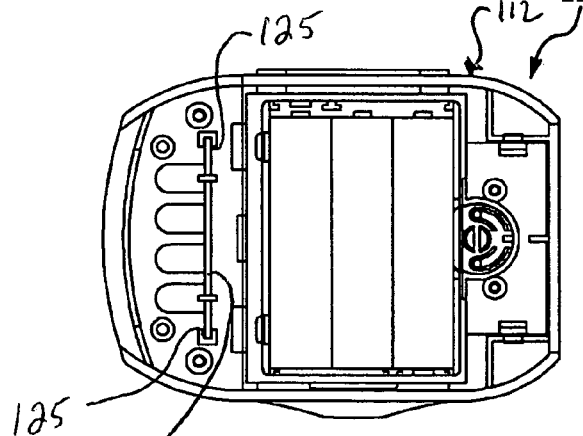
Figure 15F:
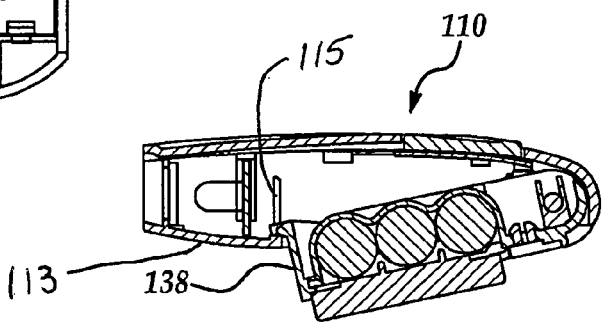

Upper housing portion 112 further comprises a lower panel portion 113, which is secured below light source 124. In one exemplary embodiment, lower panel portion 113 provides an engagement surface 115 for interaction with engagement member 138. As illustrated in FIG. 15E light source 124 comprises a circuit board with a plurality of LEDs disposed thereon. In one exemplary embodiment light source 124 is slidably received within a pair of slots 125 defined in upper housing portion 112. In one exemplary embodiment slots 125 are provided by posts molded into upper housing portion 112.

As shown in at least FIGS. 15A–15C, 15E and 15F light source 124 is positioned within the recessed area defined by upper housing portion 112 and lower panel portion 113.

In an exemplary embodiment the overall width of light source 110 is approximately the same or slightly larger than the width of a seat belt webbing. See for example FIGS. 9–14. Exemplary non-limiting widths of upper housing portion 112, lower housing portion 114 and retaining member 116 are approximately 57 mm, 50 mm and 57.5 mm respectively. Of course, and as applications may require, it is understood that the dimensions of the light source (e.g., widths) may be greater or less than the aforementioned dimensions.

In yet another alternative embodiment, the clip portion is configured to be directly secured to the seat belt and this clip would then be movably mounted to the light housing to provide numerous locations of the light housing with respect to the seat belt.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A portable light source configured for use with a vehicle seat belt, comprising:

a housing having a first housing portion and a second housing portion, said first housing portion being pivotally secured to said second housing portion, said first housing portion defining a receiving area for receiving and covering substantially all of said second housing portion therein;

a light emitting source, said light emitting source being disposed in a recessed area of said first housing portion and is electrically coupled to a power supply disposed in said second housing portion by an activation switch; and a retaining clip for securing said second housing portion to the seat belt, said retaining clip being pivotally secured to said second housing portion and comprises an engagement tab for engaging a portion of said second housing portion, wherein said first housing portion is positionable into at least two discrete positions with respect to said second housing portion and said retaining clip is configured to have a width not much larger than the width of the seat belt, wherein said second housing portion further comprises a movable engagement tab being positionable from a first position to a second position, said movable engagement tab being formed of a material having resilient characteristics and said movable engagement tab being configured to engage a portion of said first housing portion.

2. The portable light source as in claim 1, wherein said activation switch is manipulated by a switching member disposed on an upper surface of said portable light source.

3. The portable light source as in claim 1, wherein said activation switch is disposed on a circuit board having circuitry for providing a low-level and a high-level of said light emitting source.

4. The portable light source as in claim 1, wherein said light emitting source is a plurality of light emitting diodes (LEDs).

5. The portable light source as in claim 4, wherein said light emitting diodes are disposed within a recessed portion of said portable light source.

6. The portable light source as in claim 1, wherein said retaining clip and the overall width of said portable light source are configured to receive the width of a vehicle seat belt therein while the overall width of the portable light source is substantially similar to the width of the vehicle seat belt.

7. The portable light source as in claim 6, wherein said retaining clip is pivotally mounted to said second housing portion.

8. The portable light source as in claim 7, wherein said light emitting diodes are disposed within a recessed portion of said portable light source.

9. The portable light source as in claim 8, wherein said light emitting source is a plurality of light emitting diodes (LEDs).

10. The portable light source as in claim 1, wherein the width of said first housing portion is substantially similar to the width of the vehicle seat belt.

11. The portable light source as in claim 1, wherein said movable engagement tab further comprises a pair of projections for engaging a portion of said first housing, said pair of projections being located to define angular positions of said first housing with respect to said second housing such that the direction of light emitted from said light emitting source is redirected, wherein said movable engagement tab limits the range of movement of said first housing with respect to said second housing.

12. The portable light source as in claim 11, wherein said movable engagement tab is integrally formed with said second housing portion.

13. A portable light source configured for use with a vehicle seat belt, comprising:
- a housing comprising an upper housing portion and a lower housing portion, said upper housing portion being pivotally secured to said lower housing portion, said upper housing portion defining a receiving area for receiving and covering substantially all of said lower housing portion therein;
- a light carrying portion comprising a portion of said upper housing portion, said light carrying portion being configured to receive and dispose a light emitting source within a recessed portion of said portable light source, said upper housing further comprises a switching member, said switching member being movably mounted to said upper housing portion, a portion of said switching member being disposed within an opening of said upper housing portion, wherein said switching member is capable of movement from a first position to a second position upon application of an applied force and said switching member manipulating a switching mechanism of said portable light source as said switching member is manipulated from said first position to said second position, wherein said switching mechanism is configured to electrically couple a power supply to said light emitting source, wherein said lower housing portion further comprises a movable engagement tab being positionable from a first position to a second position, said movable engagement tab being formed of a material having resilient characteristics and said movable engagement tab being configured to engage a portion of said upper housing portion.

14. The portable light source as in claim 13, further comprising:
- a retaining clip for securing said light emitting source to an object, wherein the width of said retaining clip is substantially similar to the width of a vehicle seat belt.

15. The light emitting source as in claim 14, wherein said clip further comprises a protrusion for engaging the vehicle seat belt between said retaining clip and said lower housing portion.

16. The light emitting source as in claim 13, wherein said lower housing portion is configured to define a carriage for receiving a plurality of batteries.

17. The light emitting source as in claim 13, wherein said light carrying portion is integrally formed wit said upper housing portion.

18. The light emitting source as in claim 13, wherein said light emitting source is a circuit board with a plurality of LEDs disposed on a surface thereof.

19. The portable light source as in claim 18, further comprising:
- a retaining clip for securing said light emitting source to an object, wherein the width of said retaining clip is substantially similar to the width of a vehicle seat belt.

20. The portable light source as in claim 13, wherein a width of said upper housing portion is substantially similar to the width of a vehicle seat belt.

* * * * *